United States Patent [19]

Myles

[11] 4,174,331

[45] Nov. 13, 1979

[54] REFRACTORY MOLDABLE COMPOSITION CONTAINING CERAMIC FIBER AND COLLOIDAL SILICA

[75] Inventor: Thomas A. Myles, Tonawanda, N.Y.

[73] Assignee: The Carborundum Company, Niagara Falls, N.Y.

[21] Appl. No.: 656,475

[22] Filed: Feb. 9, 1976

Related U.S. Application Data

[63] Continuation-in-part of Ser. No. 475,214, May 31, 1974, abandoned, which is a continuation-in-part of Ser. No. 265,945, Jun. 23, 1972, abandoned.

[51] Int. Cl.$^2$ .................. C08L 1/04; C08L 33/24; C08L 1/10; C08L 71/02
[52] U.S. Cl. .................. 260/29.1 R; 106/38.23; 106/38.5 R; 260/29.2 EP; 260/29.6 H; 260/42.17; 264/30; 264/269
[58] Field of Search .................. 260/29.6 H, 29.2 EP, 260/29.6 R, 29.1 R, 41 A, 42.17; 106/38.5 R, 38.23, 9.76; 264/30, 269

[56] References Cited

U.S. PATENT DOCUMENTS

| | | | |
|---|---|---|---|
| 2,765,507 | 10/1956 | Wolf et al. | 260/29.6 H |
| 2,817,128 | 12/1957 | Wickett | 260/29.6 H |
| 2,821,514 | 1/1958 | Sarbach et al. | 260/29.7 S |
| 3,025,256 | 3/1962 | Janota et al. | 260/29.6 H |
| 3,104,230 | 9/1963 | Dewey et al. | 260/29.6 H |
| 3,125,404 | 3/1964 | Crawley | 8/115.7 |
| 3,262,165 | 7/1966 | Ingham | 106/38.5 R |
| 3,460,606 | 8/1969 | Boddey | 106/38.5 R |
| 3,489,714 | 1/1970 | Sayles | 260/41 A |

FOREIGN PATENT DOCUMENTS 954862 4/1964 United Kingdom.

Primary Examiner—Harold D. Anderson
Attorney, Agent, or Firm—David E. Dougherty; Raymond W. Green

[57] ABSTRACT

A refractory moldable composition which, upon drying, sets up to refractory shapes which are strongly adherent to the molding surfaces and are essentially crack-free, contains about 45 to about 65% of a liquid vehicle, such as water; about 21 to about 26% ceramic fiber; about 7 to about 30% finely divided silica; and sufficient adhesion enhancing agent to impart from about 18 to about 50 grams per square centimeter adherence to steel. The molded composition adheres excellently to molding surfaces and dries to give an essentially crack-free refractory shape, useful as thermal insulation at temperatures up to 1300° C. The composition may optionally include hollow plastic or ceramic spheres.

15 Claims, No Drawings

REFRACTORY MOLDABLE COMPOSITION CONTAINING CERAMIC FIBER AND COLLOIDAL SILICA

CROSS REFERENCE TO RELATED APPLICATIONS

This application is a continuation-in-part application of my copending application Ser. No. 475,214, filed May 31, 1974, which is a continuation-in-part of my copending application Ser. No. 265,945, filed June 23, 1972, both now abandoned.

BACKGROUND OF THE INVENTION

There is a constantly growing need for more effective insulating materials capable of withstanding the high temperatures encountered in modern day technology and which can be readily formed into a variety of shapes. A particular need exists in the area of melting, transporting and casting of non-ferrous metals where insulating materials must possess high strength, high resistance to erosion and wetting by the metal, good thermal shock resistance, and have good thermal insulating properties at the high temperatures encountered during use. In addition the materials should be easy to use and relatively inexpensive.

Various refractory compositions available in the form of precast shapes have been employed. However, such products are not well suited for use as liners, crucible spouts and the like, because of their high density, or when available in the form of lightweight brick, because of their high cost. Moreover, the use of brick and other preformed insulating materials is limited to relatively simple shapes and to applications which can accommodate the shape of the brick, such as in lining boilers, industrial furnaces and the like.

Although there are available refractory cements which can be cast in place, these materials normally have poor insulating characteristics at high temperatures, low strength, high density, or a combination of these properties which make their use undesirable. In an effort to increase the strength of these compositions and enhance their moldability, compositions containing fibrous material as the principal ingredient have been developed. These mixtures are made up, usually with water, to give fluidic compositions having densities ranging from 15 to 80 lbs/cubic foot. While these are easy to mold into the desired shape, they will shrink from 1 to 5% during drying, forming undesirable cracks in the final product and in some cases separating from the base material on which they are applied. There is a need, therefore, for a moldable insulating refractory composition that can be adjusted in density to permit maximum workability during application and that will adhere tenaciously to the surfaces commonly encountered in high temperature equipment. The composition should maintain its adhesion during drying and should set up to a relatively crack-free refractory mass which will retain its strength and adherence during subsequent heating operation up to the 1300° C. range in high temperature applications.

SUMMARY OF THE INVENTION

This invention relates to a refractory moldable composition for producing insulating materials to meet the need described above. In particular, this invention relates to a refractory moldable composition which comprises, and may consist essentially of, from about 45 to about 65% by weight liquid vehicle; from about 21 to about 26% by weight ceramic fiber; from about 7 to about 30% by weight colloidal silica; and sufficient adhesion enhancing agent to impart an adherence value to steel of from about 18 to about 50 grams per square centimeter; the liquid vehicle being a non-solvent for the ceramic fiber and colloidal silica and a solvent for the adhesion enhancing agent. In another aspect, this invention relates to a method for making moldable refractory shapes which comprises forming a refractory moldable composition as described; molding the refractory moldable composition into a desired shape and a desired location, in so doing adhering a portion of the refractory moldable composition to the sides of the desired location; and evaporating the liquid vehicle from the refractory moldable composition.

DETAILED DESCRIPTION

The refractory moldable composition of this invention contains a suitable liquid vehicle, such as water; ceramic fiber (which may be considered the "filler" of the composition in that it provides the greatest bulk to the composition, but which should not by this description be regarded as a mere inert diluent of the composition); finely divided silica; and an adhesion enhancing agent. The resulting mixtures can be readily poured, cast, gunned or otherwise formed into any desired shape. The particular advantage of the composition of the present invention is its enhanced adhesion characteristics, such that in molding the composition into a desired shape at a desired location, a portion of the refractory moldable composition can be adhered to the sides of the desired location, so that when the liquid vehicle is evaporated from the refractory moldable composition, the molded composition adheres excellently to the molding surfaces (as well as to itself) and dries to give an essentially crack-free refractory shape, useful as thermal insulation at temperatures up to 1300° C. The density of this composition may be controlled by the amount and type of liquid vehicle used; the compositions may have specific gravities ranging from about 1.1 to about 1.5. Optional ingredients include hollow plastic or ceramic spheres.

The first component of the refractory moldable composition of this invention is a liquid vehicle which may be present in an amount of from about 45 to about 65% by weight of the composition. The liquid vehicle should be chosen so that it is a non-solvent for the ceramic fiber and colloidal silica which are also included, but so that it is a solvent for the adhesion enhancing agent. Water is the preferred liquid vehicle for most applications, but other liquid vehicles can also be used such as methanol, ethanol, ethylene glycol, diethylene glycol and mixtures thereof, including mixtures with water. A preferred liquid vehicle for some applications is selected from the group consisting of water, ethylene glycol and mixtures thereof.

A second component of the refractory moldable composition of this invention is ceramic fiber, which may be present in an amount from about 21 to about 26% by weight. Unless otherwise specified, all percentages given in this specification and claims are expressed by weight, and the amount of colloidal silica is calculated as $SiO_2$. The ceramic fiber is preferably selected from the group consisting of fibers of alumina, aluminum silicate, boron oxide, boron carbide, boron nitride, silica, silicon nitride, silicon carbide, calcium-aluminum silicate, glass, mineral wool, and mixtures thereof. The fibers should have a length to diameter ratio of at least 1000 to 1 and it is preferred that they have an average length of between about 12.5 and about 25 millimeters and diameters of about 1 micron to about 20 microns. Of the above classes of fibers, those of aluminum silicate, such as those sold by The Carborundum Company of Niagara Falls, New York, under the trademark FIBER-FRAX® ceramic fibers are preferred.

A third necessary ingredient of the composition of the present invention is from about 7 to about 30% by weight finely divided (colloidal) silica. Colloidal silica acts as a thickening agent, and may be added as a water dispersion of colloidal silica which contains part of the liquid vehicle of the total composition. To effectively act as a thickener in the compositions of this invention, it is important that the silicon particles have large surface area. An amorphous silica is therefore preferred since the particles are extremely small, on the order of 12 to 15 millimicrons, and have large surface areas. One of the colloidal silicas preferred for use in compositions of this invention is Ludox® HS-40 colloidal silica, a product of E. I. duPont de Nemours & Company. This product is an aqueous dispersion of 40% amorphous silica, the silica having particles having an average size of 13 to 14 millimicrons, the suspension having a density of 10.8 lbs per gallon, corresponding to a specific gravity of 1.25.

Other dilutions of Ludox® colloidal silica can also be used, the Ludox® HS-40 colloidal silica being diluted with water to give comparable aqueous dispersions having amorphous colloidal silica contents of 30, 20 and 10%, respectively. This proprietary brand of colloidal silica is suggested as a matter of convenience, but the invention is not restricted thereto, since other comparable formulations of colloidal silica may be employed if desired.

The fourth necessary ingredient for the present invention is sufficient adhesion enhancing agent to impart to the refractory moldable composition an "adherence value" to steel of from about 18 to about 50 grams per square centimeter. A preferred adhesion enhancing agent for use in the present invention is solid acrylic polymer prepared from acrylamide. The preferred acrylic polymer for use in the compositions of the invention is a nonionic, water soluble polymer derived from acrylamide. This polymer is a homopolymer of acrylamide, having a molecular weight of approximately 1,000,000, and is sold under the trademark Reten® 420 by Hercules, Inc. Addition of this acrylic polymer to the compositions of the invention has been shown to markedly inhibit shrinkage when the molded compositions dry and harden to the final products. Compositions of the invention containing from about ¼ to about 4% of the acrylic polymer exhibit less than 0.3% linear shrinkage upon drying when using a film separation between the composition and mold; no shrinkage is observed if the composition is allowed to adhere to the mold. The acrylic polymer provides excellent adhesion of the composition to the mold surfaces and supplies a good workability to the mixture when solvent is added. The composition may be pumped, sprayed or troweled, depending on the amount of solvent added. The composition may be supplied in suitable containers as a ready mixed paste form which may then be blended with a liquid vehicle at the point of use, or the composition may be supplied in wet sheet form, encased in plastic film, ready for use.

Other adhesion enhancing agents can be substituted for the solid acrylic polymer prepared from acrylamide, such as polyethylene oxide, hydroxyethylcellulose, carboxymethylcellulose, polyamide, and mixtures of various adhesion enhancing agents. For example, "polyox" polyethylene oxide, consisting of ethylene oxide polymers with molecular weights in the range from 100,000 to several million, and sold under the trademark "Polyox" by Union Carbide Corporation; "Nalco 625" polyamide produced by the Nalco Chemical Company; and "Reten 420" polyamide produced by the Hercules Powder Company, Inc., and appropriate concentrations of hydroxyethylcellulose and hydroxymethylcellulose are also useful in the present invention. Low concentrations of hydroxyethylcellulose or hydroxylpropylcellulose or hydroxymethylcellulose have, however, proved ineffective as shrinkage inhibitors, as have thickening agents such as polysaccharide gums, polysilicate mixtures of silica and lithium oxide, and of silica and alumina, and calcium aluminate. Likewise, cornstarch, dextrose and other sugars and fumed silica are thickening agents which are not useful as adhesion enhancing agents for use in the present invention. The effectiveness of the operable adhesion enhancing agents in the compositions of this invention may be due, in part, to their ability to produce clear, smooth non-Newtonian solutions of high viscosity. While the acrylamide homopolymer (Reten® 420) is essentially nonionic and is the preferred polymer, other water soluble anionic or cationic classes of this acrylamide derived acrylic polymer appear equally effective for inhibiting shrinkage in the compositions of the invention. An example of a suitable anionic polymer is the copolymer of acrylamide and sodium acrylate, sold under the trademarks Reten® 421, 423 and 425. An example of a suitable cationic polymer is the copolymer of acrylamide and the reaction product of dimethylaminoethylmethacrylate and dimethyl sulfate, this polymer sold under the trademark Reten® 205, 210 and 220. As with the nonionic polymer, these polymers have molecular weights of approximately 1,000,000, and differ from one another primarily in their relative degree of ionic activity. The acrylic polymers apparently complex with the suspended particles in the compositions of the invention. A long range chain ordering may take place between the colloidal silica particles and the ceramic fibers of the compositions of this invention, thereby contributing additional strength to the resulting dried refractory shapes.

While water is the preferred liquid vehicle used in the moldable compositions of the invention, this may be used in conjunction with other compatible liquids such as ethanol, ethylene glycol, diethylene glycol and the like. The composition may be premixed as a thick paste, using ethylene glycol and the limited amount of water present in the colloidal silica solution as the solvent, the paste may then be stored in suitable containers as required. Additional water may be added later at the point of use, the amount added depending on the density and viscosity needed for proper application of the composition. After application, the damp composition may be air dried, or dried at 200°-230° F., if time is limited.

In addition to the filler materials of ceramic fibers as disclosed, filler materials of small hollow ceramic or plastic spheres may be used to reduce the density of the final refractory shape and increase its insulative properties. The ceramic spheres may comprise materials such as alumina, aluminum silicate, silica, glass and the like. If ceramic spheres are used, they are added to the composition in conjunction with the fibers, the weight of the spheres being from ½ to double the weight of the fibers used. The plastic spheres may be made of polymeric materials such as polyurethanes, polyamides, polyethylenes and polypropylenes. Since these are much lighter and bulkier than ceramic spheres, the weight added to a composition may be only ¼ to ½ that of the fibers. The plastic spheres burn out of the molded shape as it is exposed to high temperatures, leaving a controlled number of voids which increase the insulating properties of the refractory.

A preferred refractory moldable composition according to this invention comprises from about 62 to about 79% liquid vehicle; from about 20 to about 34% ceramic fiber; from about 7 to about 30% colloidal silica; and from about ¼ to about 4% (preferably from about ¼ to about 2½%) of the acrylic polymer. Another preferred composition may comprise from about 45 to about 65% liquid vehicle; from about 21 to about 26% ceramic fiber; from about 7 to about 30% of colloidal silica; and about ¼ to about 4% acrylic polymer. A further preferred composition may comprise from about 47 to about 50% liquid vehicle; from about 21 to about 22% ceramic fiber; from about 28 to about 30% colloidal silica; and about ¼ to about ¾% acrylic polymer.

The compositions of the invention are easily formulated by standard procedures, as shown in the following examples.

Examples 1, 2, 3, and 4 set forth procedures for preparing preferred compositions of the invention.

EXAMPLE 1

A batch of the preferred moldable composition, including colloidal silica, was prepared in which the preferred nonionic acrylamide homopolymer (Reten ® 420) was employed. For this composition, 6 lbs. (2720 gms) of the homopolymer was mixed with 7 gallons (26.6 liters) of ethylene glycol. This mixture was then combined with 90 gallons (341 liters) of 40% colloidal silica solution (Ludox ® HS-40) and 288 lbs. (130.5 kilograms) of aluminum silicate fibers were added. The resulting composition was thoroughly mixed until smooth and was then ready for application. When applied to high temperature surfaces such as furnace walls, the resulting refractory coatings showed thermal conductivities ranging from about 0.6 Btu to about 1.5 Btu/inch/hr/ft²/° F., the temperature of the furnace walls ranging from about 400 to about 1600° F. The coatings were applied to give thicknesses ranging from about 1 to about 3 inches when dried.

EXAMPLE 2

A similar batch of moldable composition was prepared in which 1.25 lbs. (56.8 gms) of alumina bubbles were added to 5 lbs. (2260 gms) of the composition as prepared in Example 1. The alumina bubbles had average diameters ranging from about 0.132 inches (0.34 cm) to about 0.223 inches (0.57 cm). The mixture was stirred until the bubbles were well dispersed. A refractory coating of reduced density but with superior insulating properties and resistance to shrinkage at high temperatures was obtained from this formulation when it was applied as described in Example 1.

EXAMPLE 3

A batch of moldable composition was prepared in which an anionic copolymer of acrylamide and sodium acrylate (Reten ® 423) was employed. For this composition 0.044 lbs. (22 gms) of the copolymer was mixed with 0.026 gallons (100 ml) of ethylene glycol. This mixture was then added to 3.78 lbs. (1720 gms) of 40% colloidal silica solution (Ludox ® HS-40), containing 1.13 lbs. (512 gms) of aluminum silicate fiber. The resulting composition was thoroughly mixed until smooth and was then applied as described in Example 1 to give a refractory coating of comparable insulative properties.

EXAMPLE 4

A fourth batch of moldable composition was prepared, using the same materials and proportions as in Example 3, except for the substitution of a cationic copolymer of acrylamide and the reaction product of dimethylaminoethylmethacrylate and dimethyl sulfate (Reten ® 205) for the anionic polymer of Example 3. This composition gave a refractory coating comparable in insulative properties to those described in Examples 1 and 3.

The compositions of the invention may be formulated with varying degrees of solid content, those mixtures of lower solid content being preferred for application by spraying or gunning. Examples of silica containing formulations in these ranges are shown in Table 1 where the solid content of the preferred composition is adjusted by using different dilutions of the Ludox ® HS-40 colloidal silica, the amounts of aluminum silicate filler and acrylic polymer being the same in all the compositions. All amounts are given in grams.

TABLE 1

| COMPOSITION: | A | B | C | D |
| --- | --- | --- | --- | --- |
| Aluminum silicate fibers | 1026 | 1026 | 1026 | 1026 |
| Ludox ® HS-40 | 3428 | 2385 | 1480 | 696 |
| Water Added | — | 795 | 1480 | 2088 |
| Acrylic Polymer | 86.3 | 86.3 | 86.3 | 86.3 |
| Solids in composition | 54.6% | 47.8% | 41.7% | 35.6% |

Although aluminum silicate fibers have been shown as the filler material in the above formulations, other fibrous heat resistant materials as previously described may be employed as well. Compositions of lower densities may also be achieved by the replacement of part of the fibers with hollow ceramic or plastic spheres.

The compositions of the invention may be formulated to give refractory shapes effective at temperatures up to 1300° C. and may be used in furnaces to insulate crossover pipes and other exposed metal components, to insulate burner blocks or to seal cracks in joints between insulation blocks. The compositions are useful for covering and insulating many other types of high temperature equipment, especially in applications where the initial adherence of the composition is important and where drying shrinkage must be kept at the lowest possible level or eliminated altogether.

Other adhesion enhancing agents can be used, so long as they impart an "adherence value" to steel of from about 18 to about 50 grams per square centimeter. The "adherence value" can be determined by measuring the minimum wet strength required of a moldable composition to prevent shrinkage away from the surface to which the moldable composition is applied during drying. This measurement can be made by casting (using a trowel or spatula) the composition into a cylindrical mold having a three-inch diameter and a one-inch height, and placing a steel plate horizontally in contact with the composition. The vertical force applied in order to obtain separation is then measured. It has been found that in order to obtain a proper composition, this value should be between about 18 and about 50 grams per square centimeter (preferably from about 30 to about 35 grams per square centimeter). For example, a composition containing 272 grams Fiberfrax ® aluminum silicate ceramic fibers, 926 grams Ludox ® HS-40 colloidal silica (40% dispersion in water), 2 grams Polyox ® polyethylene oxide, and 62 grams of ethylene glycol is a preferred composition for use in the present invention. Decreasing the amount of polyethylene oxide to 1 gram provides the minimum amount of adhesion value to obtain proper results. Likewise, 11.3 grams Reten ® 420 polyamide, 20.0 grams of Nalco ® 625 polyamide, or 20.0 grams of hydroxyethylcellulose will provide the necessary adhesion value.

I claim:

1. A refractory moldable composition consisting essentially of:
   (a) from about 45 to about 65% by weight liquid vehicle;
   (b) from about 21 to about 26% by weight ceramic fiber;
   (c) from about 7 to about 30% by weight colloidal silica; and
   (d) sufficient adhesion enhancing agent selected from the group consisting of solid acrylic polymer prepared from acrylamide; polyethylene oxide; hydroxyethylcellulose; carboxymethylcellulose; and mixtures thereof, to impart an adherence value to steel, measured by casting the composition into a cylindrical mold having a three-inch diameter and a one-inch height, and placing a steel plate horizontally in contact with the composition, and measuring the vertical force necessary to obtain separation, of from about 18 to about 50 grams per square centimeter;
the liquid vehicle being a non-solvent for the ceramic fiber and colloidal silica and a solvent for the adhesion enhancing agent.

2. A refractory moldable composition according to claim 1, wherein the ceramic fiber is selected from the group consisting of alumina, aluminum silicate, boron oxide, boron carbide, boron nitride, silica, silicon nitride, silicon carbide, calcium-aluminum silicate, glass, mineral wool, and mixtures thereof.

3. A refractory moldable composition according to claim 1, including in addition hollow ceramic spheres of at least one material selected from the group consisting of alumina, aluminum silicate, silica, and glass; the hollow ceramic spheres being present in an amount equal to from about ½ to about twice the weight of the ceramic fibers.

4. A refractory moldable composition according to claim 1, including in addition hollow plastic spheres of at least one material selected from the group consisting of polyethylenes and polypropylenes; the hollow plastic spheres being present in an amount equal to from about ¼ to about ½ the weight of the ceramic fibers.

5. A refractory moldable composition according to claim 1, wherein the adhesion enhancing agent is solid acrylic polymer prepared from acrylamide.

6. A refractory moldable composition consisting essentially of from about 62 to about 79% liquid vehicle; from about 20 to about 34% ceramic fiber; from about 7 to about 30% colloidal silica; and from about ¼ to about 2½% solid acrylic polymer prepared from acrylamide.

7. A refractory moldable composition according to claim 6, consisting essentially of from about 45 to about 65% by weight liquid vehicle; from about 21 to about 26% ceramic fiber; from about 7 to about 30% colloidal silica; and from about ¼ to about 4% solid acrylic polymer prepared from acrylamide.

8. A refractory moldable composition according to claim 6, consisting essentially of from about 47 to about 50% liquid vehicle; from about 21 to about 22% ceramic fiber; from about 28 to about 30% colloidal silica; and from about ¼ to about ¾% solid acrylic polymer prepared from acrylamide.

9. A refractory moldable composition according to claim 1, wherein the liquid vehicle is selected from the group consisting of water, methanol, ethanol, ethylene glycol, diethylene glycol, and mixtures thereof.

10. A refractory moldable composition according to claim 9, wherein the liquid vehicle is selected from the group consisting of water, ethylene glycol and mixtures thereof.

11. A refractory moldable composition according to claim 10, wherein the liquid vehicle is water.

12. A refractory moldable composition according to claim 1, wherein the adhesion enhancing agent is present in an amount sufficient to impart an adhesion value to steel of from about 30 to about 35 grams per square centimeter.

13. A refractory moldable composition consisting essentially of:
   (a) about 272 parts by weight aluminum silicate ceramic fibers;
   (b) about 926 parts by weight colloidal silica, said colloidal silica being a 40% dispersion in water;
   (c) about 62 parts by weight ethylene glycol; and
   (d) from about 1 to about 2 parts by weight polyethylene oxide.

14. A refractory moldable composition consisting essentially of:
   (a) about 272 parts by weight aluminum silicate ceramic fibers;
   (b) about 926 parts by weight colloidal silica, said colloidal silica being a 40% dispersion in water;
   (c) about 62 parts by weight ethylene glycol; and
   (d) about 20 parts by weight hydroxyethylcellulose.

15. A method for making moldable refractory shapes, which comprises:
   (a) forming a refractory moldable composition according to claim 1;
   (b) molding the refractory moldable composition into a desired shape and a desired location, in so doing adhering a portion of the refractory moldable composition to the sides of the desired location; and
   (c) evaporating the liquid vehicle from the refractory moldable composition.

* * * * *